United States Patent
Song et al.

(10) Patent No.: US 11,522,251 B2
(45) Date of Patent: *Dec. 6, 2022

(54) SEPARATOR HAVING COATING LAYER INCLUDING PARTIALLY REDUCED GRAPHENE OXIDE AND LITHIUM ION CONDUCTING POLYMER AND LITHIUM SECONDARY BATTERY COMPRISING THE SAME

(71) Applicant: LG ENERGY SOLUTION, LTD., Seoul (KR)

(72) Inventors: Jieun Song, Daejeon (KR); Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 260 days.

This patent is subject to a terminal disclaimer.

(21) Appl. No.: 16/649,605

(22) PCT Filed: Oct. 8, 2018

(86) PCT No.: PCT/KR2018/011839
§ 371 (c)(1),
(2) Date: Mar. 20, 2020

(87) PCT Pub. No.: WO2019/083194
PCT Pub. Date: May 2, 2019

(65) Prior Publication Data
US 2020/0388809 A1 Dec. 10, 2020

(30) Foreign Application Priority Data
Oct. 26, 2017 (KR) .................. 10-2017-0139968

(51) Int. Cl.
*H01M 50/431* (2021.01)
*H01M 10/0525* (2010.01)
(Continued)

(52) U.S. Cl.
CPC ..... *H01M 50/431* (2021.01); *H01M 10/0525* (2013.01); *H01M 50/403* (2021.01); *H01M 50/449* (2021.01); *H01M 2220/20* (2013.01)

(58) Field of Classification Search
CPC . H01M 50/431; H01M 50/403; H01M 50/449
(Continued)

(56) References Cited

U.S. PATENT DOCUMENTS

2013/0314844 A1 11/2013 Chen et al.
2016/0067654 A1 3/2016 Zhang et al.
(Continued)

FOREIGN PATENT DOCUMENTS

CN 103950239 A 7/2014
CN 105940525 A 9/2016
(Continued)

OTHER PUBLICATIONS

Celgard, Celgard® High Performance Battery Separators, 2009, Celgard (Year: 2009).*
(Continued)

*Primary Examiner* — Sean P Cullen
(74) *Attorney, Agent, or Firm* — Birch, Stewart, Kolasch & Birch, LLP (57) ABSTRACT

A separator in which at least one surface of a porous base is coated with a coating layer including partially-reduced graphene oxide and a lithium ion conducting polymer, and thereby capable of resolving problems caused by lithium polysulfide occurring in a lithium secondary battery, and a lithium secondary battery including the same.

12 Claims, 3 Drawing Sheets

(51) Int. Cl.
*H01M 50/403* (2021.01)
*H01M 50/449* (2021.01)

(58) Field of Classification Search
USPC .......................................... 429/145, 251, 254
See application file for complete search history.

(56) References Cited

U.S. PATENT DOCUMENTS

| | | | |
|---|---|---|---|
| 2016/0336625 | A1 | 11/2016 | Jeong et al. |
| 2017/0005307 | A1 | 1/2017 | Kuratani et al. |
| 2017/0092975 | A1 | 3/2017 | Kim et al. |
| 2017/0093001 | A1 | 3/2017 | Kim et al. |
| 2017/0106626 | A1 | 4/2017 | Miyazono et al. |
| 2018/0269453 | A1 | 9/2018 | Cho et al. |
| 2020/0328391 | A1* | 10/2020 | Song ................. H01M 4/38 |

FOREIGN PATENT DOCUMENTS

| | | |
|---|---|---|
| CN | 107068945 A | 8/2017 |
| JP | 2005-190736 A | 7/2005 |
| JP | 2016-7816 A | 1/2016 |
| JP | 2016-219411 A | 12/2016 |
| KR | 10-1455943 B1 | 11/2014 |
| KR | 10-2016-0067322 A | 6/2016 |
| KR | 10-2016-0077529 A | 7/2016 |
| KR | 10-2017-0037533 A | 4/2017 |
| WO | WO 2015/088451 A1 | 6/2015 |
| WO | WO 2015/115513 A1 | 8/2015 |
| WO | WO 2015/190432 A1 | 12/2015 |

OTHER PUBLICATIONS

Hao et al., High performance lithium-sulfur batteries with a facile and effective dual functional separator, May 2016, Electrochimica Acta, 200, 197-203 (Year: 2015).*

Zhao et al., Reduced graphene oxide with ultrahigh conductivity as carbon coating layer for high performance sulfur@reduced graphene oxide cathode, Jan. 2014, Journal of Power Sources, 245, 529-536 (Year: 2014).*

Database WPI, Thomson Scientific, AN 2017-469817, Jul. 7, 2017, 2 pages, XP002799313.

Extended European Search Report dated Jun. 24, 2020 for Application No. 18869523.3.

Jiang et al., "Inhibiting the shuttle of Li—S battery with a graphene oxide coating separator: Performance improvement and mechanism study", Journal of Power Sources, vol. 342, 2017 (Available online Jan. 10, 2017), pp. 929-938.

Lin et al., "Enhanced Performance of Lithium Sulfur Battery with Reduced Graphene Oxide Coating Separator", Journal of the Electrochemical Society, vol. 162, No. 8, 2015, pp. A1624-A1629 ( 7 pages total), XP-002799312.

Morimoto et al., "Tailoring the Oxygen Content of Graphite and Reduced Graphene Oxide for Specific Applications", Scientific Reports, Feb. 25, 2016, pp. 1-8.

Nishi, "Lithium Ion Secondary Batteries with Gelled Polymer Electrolytes," Kobunishi, vol. 54, No. 12, Dec. 1, 2005, pp. 870-873, with English abstract (5 pages total).

Jin et al., "Application of lithiated Nafion ionomer film as functional separator for lithium sulfur cells," Journal of Power Sources, vol. 218, 2012, pp. 163-167 (5 pages total).

Zhuang et al., "Rational Integration of Polypropylene/Graphene Oxide/Nafion as Ternary-Layered Separator to Retard the Shuttle of Polysulfides for Lithium-Sulfur Batteries," Small, vol. 12, No. 3, 2016, pp. 361-389 (9 pages total).

International Search Report for PCT/KR2018/011839 (PCT/ISA/210) dated Jan. 21, 2019.

Singh et al., "3-D vertically aligned few layer graphene—partially reduced graphene oxide/sulfur electrodes for high performance lithium-sulfur batteries", Sustainable Energy Fuels, 2017, 1, pp. 1516-1523.

* cited by examiner

SEPARATOR HAVING COATING LAYER INCLUDING PARTIALLY REDUCED GRAPHENE OXIDE AND LITHIUM ION CONDUCTING POLYMER AND LITHIUM SECONDARY BATTERY COMPRISING THE SAME

TECHNICAL FIELD

This application claims priority to and the benefits of Korean Patent Application No. 10-2017-0139968, filed with the Korean Intellectual Property Office on Oct. 26, 2017, the entire contents of which are incorporated herein by reference.

The present invention relates to a separator capable of resolving problems caused by lithium polysulfide, and a lithium secondary battery comprising the same.

BACKGROUND ART

As electronic goods, electronic devices, communication devices and the like have rapidly become smaller and lighter recently, and necessity of electric vehicles has highly emerged regarding environmental problems, demands for improving performance of secondary batteries used as a power source of these goods have greatly increased. Among these, lithium secondary batteries have received considerable attention as a high performance battery due to their high energy density and high standard electrode potential.

Particularly, lithium-sulfur (Li—S) batteries are a secondary battery using a sulfur series material having sulfur-sulfur (S—S) bonds as a positive electrode active material, and using lithium metal as a negative electrode active material. Sulfur, a main material of a positive electrode active material, has advantages of being very abundant in resources, having no toxicity and having a low atomic weight. In addition, a lithium-sulfur battery has theoretical discharge capacity of 1675 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—MnO$_2$ battery: 1,000 Wh/kg, Na—S battery: 800 Wh/kg) currently studied, and therefore, is a most promising battery among batteries that have been developed so far.

During a discharge reaction of a lithium-sulfur battery, an oxidation reaction of lithium occurs in a negative electrode (anode), and a reduction reaction of sulfur occurs in a positive electrode (cathode). The lithium-sulfur battery produces lithium polysulfide (Li$_2$S$_x$, x=2 to 8) during discharge, and this is dissolved in an electrolyte and diffused to a negative electrode causing various side reactions, and also reduces capacity of sulfur participating in an electrochemical reaction. In addition, the lithium polysulfide causes a shuttle reaction during a charging process significantly reducing charge and discharge efficiency.

In order to resolve such problems, methods of adding an additive having a sulfur-adsorbing property have been proposed, however, a deterioration problem has occurred newly producing additional battery side reactions. In view of the above, methods of adding a metal chalcogenide, alumina or the like or coating the surface with oxycarbonate and the like have been proposed in order to delay an outflow of a positive electrode active material, that is, sulfur, however, such methods either have the sulfur lost during a treatment process or are complicated, and also limit the amount of sulfur, an active material, to introduce (that is, loading amount).

Accordingly, for commercialization of a lithium-sulfur battery, the problems of lithium polysulfide are a priority issue.

PRIOR ART DOCUMENTS

Patent Documents

[Patent Document 1] U.S. Pat. No. 9,700,850 (2017 Jul. 11), "Ion exchange membrane including inorganic particles"

[Patent Document 2] Korean Patent No. 10-1678817 (2016 Nov. 17), "Method for preparing reduced graphene oxide, reduced graphene oxide obtained according thereto, method for preparing barrier film using the same and barrier film obtained according thereto"

DISCLOSURE

Technical Problem

In order to resolve lithium polysulfide problems occurring on a positive electrode side of a lithium secondary battery, the inventors of the present invention have identified that, when applying a new structure using partially-reduced graphene oxide and a lithium ion conducting polymer in a separator adjoining thereto, the problems are resolved and battery performance of a lithium secondary battery may be enhanced, and have completed the present invention.

Accordingly, an aspect of the present invention provides a separator for a lithium secondary battery capable of resolving problems caused by lithium polysulfide.

Another aspect of the present invention provides a lithium secondary battery having enhanced battery performance by being provided with the separator.

Technical Solution

According to an aspect of present invention, there is provided a separator for a lithium secondary battery comprising a porous base; and a coating layer formed on at least one surface of the porous base, wherein the coating layer comprises partially-reduced graphene oxide and a lithium ion conducting polymer.

Herein, in the coating layer, the partially-reduced graphene oxide and the lithium ion conducting polymer are present in the coating layer in a weight ratio of 1:5 to 1:20.

According to another aspect of present invention, there is provided a lithium secondary battery comprising the separator for a lithium secondary battery.

Advantageous Effects

A separator according to the present invention comprises both partially-reduced graphene oxide and a lithium ion conducting polymer, and thereby resolves problems caused by lithium polysulfide occurring in a positive electrode of a lithium secondary battery.

In the lithium secondary battery provided with the separator, a decrease in sulfur capacity does not occur allowing high capacity battery, and battery stability is enhanced since sulfur can be stably used in high loading and there are no problems such as battery short circuit and heat generation. Moreover, such a lithium secondary battery has advantages of having high battery charge and discharge efficiency and improving lifetime properties.

BEST MODE

Hereinafter, the present invention will be described in detail with reference to accompanying drawings so that those skilled in the art may readily implement the present invention. However, the present invention may be implemented in various different forms, and is not limited to the present specification.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

The term 'composite' used in the present specification means a material combining two or more materials, and exhibiting more effective functions while forming physically and chemically different phases.

A lithium secondary battery means an electrochemical device manufactured by using a material capable of intercalation/deintercalation of lithium ions as a negative electrode and a positive electrode, and filling an organic electrolyte liquid or a polymer electrolyte liquid between the negative electrode and the positive electrode, and producing electric energy by an oxidation/reduction reaction when the lithium ions are intercalated and deintercalated in the positive electrode and the negative electrode. According to one embodiment of the present invention, the lithium secondary battery may be a lithium-sulfur battery comprising a sulfur compound as an electrode active material of the positive electrode.

The present invention provides a lithium secondary battery and a separator used therein.

Figure 1:
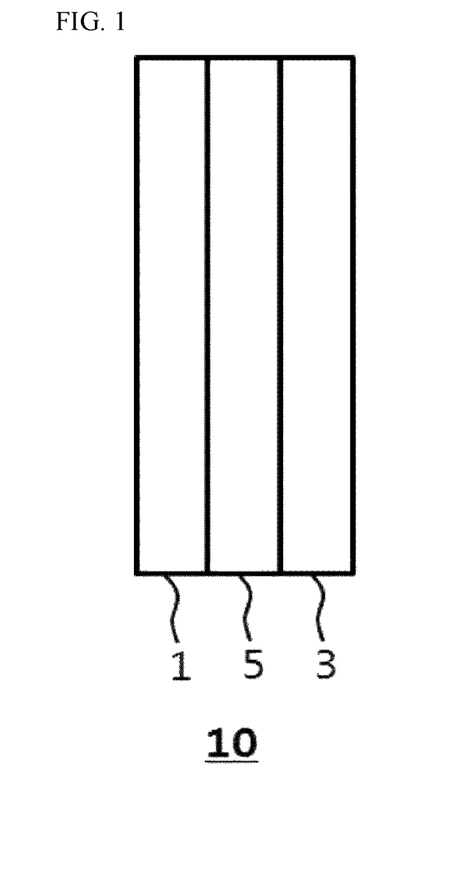
FIG. 1 is a sectional view illustrating a lithium secondary battery according to one embodiment of the present invention.

FIG. 1 is a sectional view illustrating a lithium secondary battery (10), which has a structure comprising lithium metal as a negative electrode (1) and sulfur as a positive electrode (3), and a separator (5) disposed therebetween. Herein, an electrolyte (not shown) is present in a form in which the separator (5) is impregnated between the negative electrode (1) and the positive electrode (3).

When charging and discharging a lithium secondary battery (10), lithium polysulfide is produced in a positive electrode causing a decrease in the charge capacity and a decrease in the energy of the battery (10), and lithium dendrite is generated in a negative electrode causing a stability problem such as short circuit, heat generation, ignition and exposition of the battery together with a decrease in the battery lifetime. In order to resolve such problems, methods of adding a new composition or forming an additional coating layer on the electrodes have been proposed, however, an effect of enhancing battery performance to a target level has not been able to be secured.

In view of the above, the present invention proposes a separator (5) having a new structure in order to resolve such problems.

Specifically, the separator (5) according to the present invention forms a porous base and a coating layer on one surface or both surfaces of the porous base. When forming the coating layer on one surface of the porous base, the coating layer may be placed on any of the negative electrode (1) side or the positive electrode (3) side, and in the present invention, the coating layer is preferably formed so as to face the positive electrode (3).

The porous base forming the separator (5) enables lithium ion transport between the negative electrode (1) and the positive electrode (3) while separating or insulating the negative electrode (1) and the positive electrode (3) from each other. Such a separator (5) may be formed with materials that are porous, nonconductive or insulating. The separator (5) may be an independent member such as a film.

Specifically, as the porous base, a porous polymer film may be used either alone, or as a laminate thereof, or common porous non-woven fabrics such as non-woven fabrics made of high melting point glass fiber or polyethylene terephthalate fiber may be used, however, the porous base is not limited thereto.

A material of the porous base is not limited in the present invention, and materials commonly used in the art may be used. Typically, the porous base may be formed with any one selected from the group consisting of polyolefin such as polyethylene or polypropylene, polyester such as polyethylene terephthalate, polybutylene terephthalate or polyethylene naphthalene, polyamide such as aramid or nylon, polyacetal, polycarbonate, polyimide, polyetherketone, polyethersulfone, polyphenylene oxide, polyphenylene sulfide, polytetrafluoroethylene, polyvinylidene fluoride, polyvinyl chloride, polyacrylonitrile, cellulose, polyparaphenylene benzobisoxazole and polyarylate, or a mixture of two or more thereof.

The porous base may have a thickness of 3 μm to 100 μm, or 3 μm to 30 μm. The range of the porous base is not limited particularly to the range described above, however, when the thickness is excessively smaller than the above-described lower limit, mechanical properties decline and the separator (5) may be readily damaged during battery use. Meanwhile, sizes of pores present in the porous base and porosity are not particularly limited as well, but may be from 0.01 μm to 10 μm and 25% to 85%, respectively.

The coating layer formed on at least one surface of the porous base performs a role of resolving problems caused by lithium polysulfide, and for this, comprises both partially-reduced graphene oxide and a lithium ion conducting polymer.

Graphene oxide is an oxide form of graphene, and is one type of carbon material in which various oxygen-including functional groups such as epoxy, hydroxyl, lactone, lactol, ketone, ester and carboxylic acid are irregularly arranged in a graphene two-dimensional carbon lattice skeleton. Graphene itself has high electrical conductivity, and with this property, it is difficult to use graphene in the separator (5) to which an electrolyte liquid is supported and lithium ions are transferred. While graphene oxide has very high electrical resistance with an insulator property, lithium ions may readily migrate between laminated graphene oxide.

When heated to a certain temperature or higher, such graphene oxide has a property of being decomposed to 'reduced graphene oxide' (hereinafter, rGO), a carbon material close to graphene, while spontaneously releasing gases such as CO, $H_2O$ or $CO_2$.

Particularly, the present invention is capable of enhancing Coulomb efficiency circulation and stability of a battery by using 'partially-reduced graphene oxide' produced by heating graphene oxide at 350° C. to 450° C. in the coating layer of the separator (5) to adsorb lithium polysulfide generated by a reaction between sulfur of the positive electrode (3) and lithium of the negative electrode (1), and thereby resolving a problem of side reactions occurring on the negative electrode (1) surface due to a shuttle effect thereof such as reacting with lithium metal to form a high-resistance layer of a sulfide-based SEI layer at the interface, or precipitating at the electrode interface.

Moreover, by binding the lithium polysulfide to the coating layer of the separator (5) and thereby suppressing diffusion and migration of the lithium polysulfide to the negative electrode (1), an existing problem of sulfur capacity loss caused by lithium polysulfide is resolved, and a high capacity battery is obtained, and safety is obtained even when high loading sulfur. In addition thereto, by binding the lithium polysulfide, escaping from an electrochemical reaction region of the positive electrode (3) is minimized.

The partially-reduced graphene oxide provided in the present invention somewhat varies depending on the preparation method, however, an oxygen-including function group is present on the surface or inside, and various types of defects are present. In addition, depending on the preparation method, a hydroxyl group is normally present on the surface and the inside, and in addition thereto, a carboxyl group, a carbonyl group or an epoxy group may be present, or a functional groups such as an ester group, an ether group, an amide group or an amino group may be further comprised. The graphene oxide exhibits hydrophilicity by the functional groups and is dispersed into an aqueous solution or a hydrophilic solvent, and, by applying ultrasonic waves thereto, is peeled off resulting in a sheet or flake form having a very small thickness.

Specifically, the partially-reduced graphene oxide has a thickness of 1 nm to 500 nm, preferably 1 nm to 100 nm and more preferably 1 nm to 50 nm, has a length of 1 μm to 30 μm, may have a particle diameter of 0.1 μm to 100 μm and preferably 1 μm to 30 μm, which may be controlled depending on the coating purpose. Due to its thickness of a several nm level, the graphene oxide has an advantage of maintaining a nano-level thickness even when being laminated in several layers. Due to such a small nano-level thickness, graphene oxide has flexible properties, is readily laminated on the porous base, and, due to its hydrophilic properties, has excellent adhesive strength for the separator (5), and is not readily separated during coating or during working.

In addition, the partially-reduced graphene oxide according to one embodiment of the present invention may comprise an oxygen atom in 1% to 30%, preferably in 2% to 20% and most preferably in 3% to 17% with respect to a total of the partially-reduced graphene oxide through the heat treatment.

When the oxygen atom composition is less than the above-mentioned range, graphene oxide is excessively reduced and exhibits properties of non-oxidized graphene, which decreases adsorption capability of lithium polysulfide. When the oxygen atom composition is greater than the above-mentioned range, an effect of enhancing battery performance in a high loading electrode is insignificant when using this in the separator of a lithium secondary battery, and therefore, the oxygen atom composition is properly controlled within the above-mentioned range.

Even when problems caused by lithium polysulfide is resolved, graphene oxide having such an effect has had a new problem of slowing a lithium ion transfer rate when actually used as the separator (5) due to plate structure properties of the graphene oxide.

In other words, when graphene oxide having a nano-level thickness is laminated alone on the separator (5), lamination is obtained at a high level, and the graphene oxide does not form a sufficient level of channels to transport lithium ions making lithium ion transfer difficult. In other words, when using a liquid electrolyte, the separator (5) needs to be present in a sufficiently impregnated (wetted) by the liquid electrolyte in order for lithium ions to pass through the separator (5) and be transported to the positive electrode (3) and the negative electrode (1). The lithium ions are difficult to vertically pass with respect to a length direction of the graphene oxide, and is transported through a lithium ion diffusion path between laminated graphene oxide. Herein, when the plate-structured graphene oxide is laminated in high density, the path may not be readily secured, or lithium ions are transported through the path after moving horizontally with respect to the length direction such that the lithium ion transport path may become longer than necessary, which causes a problem of slowing a lithium ion transfer rate. The slowed lithium ion transfer rate increases impedance inside a battery as well as resulting in low lithium ion conductivity ultimately causing a problem of declining battery performance (that is, specific capacity).

In view of the above, the present invention uses the partially-reduced graphene oxide mixing with a lithium ion conducting polymer in order to resolve problems caused when using the partially-reduced graphene oxide alone.

In order to be mixed with graphene oxide, materials capable of readily securing a lithium ion diffusion path and increasing lithium ion conductivity without affecting lithium polysulfide adsorption obtained by the graphene oxide need to be selected.

The lithium ion conducting polymer according to one embodiment of the present invention may comprise one or more material selected from the group consisting of polyurethane, lithium-substituted NAFION™ (lithiated NAFION™), polyethylene oxide, polypropylene oxide, polysiloxane, polystyrene and polyethylene glycol. Among these, lithium-substituted NAFION™ (lithiated NAFION™) may be preferably used in the present invention.

The lithium-substituted NAFION™ (lithiated NAFION™) polymer according to one embodiment of the present invention is a polymer having a form of comprising lithium ions in NAFION™ (trade name, Du Pont), a copolymer of a sulfonated tetrafluoroethylene-based fluorine polymer, and means a form of comprising $Li^+$ ions instead of protons of the sulfonic acid group in a chemical formula structure such as below.

[Chemical Formula 1]

x H$_2$O

By mixing the partially-reduced graphene oxide and the lithium ion conducting polymer as above, the lithium ion transferring path may be readily secured, and lithium ions are readily transferred therethrough, and problems that have been occurring when using graphene oxide alone may be sufficiently resolved.

Moreover, the partially-reduced graphene oxide and the lithium ion conducting polymer used as a coating layer material according to the present invention have hydrophilicity, and the partially-reduced graphene oxide of the present invention has a porous form by going through thermal expansion in the heat treatment process, and therefore, high wettability is obtained when using a hydrophilic solvent as an electrolyte liquid effectively transferring lithium ions to the lithium metal layer side. Accordingly, lithium ions may be uniformly transferred to the negative electrode. As a result, excellent battery properties are obtained without a battery short-circuit since lithium ions are effectively transferred, and excellent charge and discharge properties are obtained without increasing resistance even with coating layer formation.

In order to sufficiently secure the above-mentioned effects, the coating layer according to the present invention limits a content ratio of the partially-reduced graphene oxide and the lithium ion conducting polymer, and a thickness of the coating layer.

Specifically, the partially-reduced graphene oxide:lithium ion conducting polymer are present in the coating layer in a weight ratio of 1:5 to 1:20 and preferably in a weight ratio of 1:10 to 1:15 in the coating layer. When the partially-reduced graphene oxide content is low (or the content of the lithium ion conducting polymer is excessive), problems caused by lithium polysulfide may not be sufficiently resolved. On the other hand, when the content of the lithium ion conducting polymer is low (or the content of the partially-reduced graphene oxide is excessive), there is a problem in that penetration of an electrolyte liquid is difficult.

In addition, the coating layer thickness is in a range not increasing internal resistance of a battery while securing the above-described effects, and may be from 50 nm to 20 μm. Preferably, the thickness may be from 100 nm to 10 μm and more preferably from 200 nm to 3 μm. When the thickness is less than above-mentioned range, functions as a coating layer may not be performed, and when the thickness is greater than the above-mentioned range on the other hand, stable interfacial properties may be provided, however, an increase in the internal resistance may be caused when manufacturing a battery due to an increase in the initial interfacial resistance.

As described above, the coating layer may be formed on one surface or both surfaces of the separator (5), and, in order to increase a lithium polysulfide adsorption effect, may be formed so as to face the positive electrode (3).

A method for preparing the separator (5) presented in the present invention is not particularly limited in the present invention, and known methods or various methods modifying these methods may be used by those skilled in the art.

As one method, a coating solution including the partially-reduced graphene oxide and the lithium ion conducting polymer in a solvent is prepared, and then the coating solution is coated on at least one surface of a porous base and then dried.

As another method, the coating solution is coated on a substrate, and then dried to prepare a coating layer, and the coating layer is transferred or laminated on a porous base to prepare the separator (5).

Any solvent may be used as the solvent as long as it is capable of sufficiently dispersing the partially-reduced graphene oxide and the lithium ion conducting polymer. As one example, the solvent may be a mixed solvent of water and alcohol, or a mixture of one or more organic solvents, and in this case, the alcohol may be a lower alcohol having 1 to 6 carbon atoms, and preferably, methanol, ethanol, propanol, isopropanol and the like. As the organic solvent, polar solvents such as dimethyl-formamide (DMF) and dimethyl sulfoxide (DMSO), or aprotic solvents such as acetonitrile, ethyl acetate, methyl acetate, fluoroalkane, pentane, 2,2,4-trimethylpentane, decane, cyclohexane, cyclopentane, diisobutylene, 1-pentene, 1-chlorobutane, 1-chloropentane, o-xylene, diisopropyl ether, 2-chloropropane, toluene, 1-chloropropane, chlorobenzene, benzene, diethyl ether, diethyl sulfide, chloroform, dichloromethane, 1,2-dichloroethane, aniline, diethylamine, ether, carbon tetrachloride and tetrahydrofuran (THF) may be used. Preferably, water or a mixed solvent of water and a lower alcohol may be used.

The solvent may be included at a level having a concentration capable of facilitating coating, and the specific content varies depending on the coating method and the apparatus. As one example, the coating solution may be prepared by dispersing each of the partially-reduced graphene oxide and the lithium ion conducting polymer into a solvent and mixing the resulant, and herein, the coating is performed after adjusting a final coating solution concentration to be in a range of 0.001% by weight to 30% by weight (solid content).

According to one embodiment of the present invention, the partially-reduced graphene oxide may be present in the coating layer in an amount of 5 μg/cm$^2$ to 100 μg/cm$^2$, preferably in 5 μg/cm$^2$ to 40 μg/cm$^2$ and most preferably in 5 μg/cm$^2$ to 20 μg/cm$^2$ with respect to the total area of the separator.

When the coating amount of the partially-reduced graphene oxide is less than the above-mentioned range, a lithium polysulfide adsorption ability may decline, and the coating amount being greater than the above-mentioned range has a disadvantage of decreasing lithium ion conductivity or making electrolyte liquid penetration difficult, and therefore, the coating amount is properly selected within the above-mentioned range.

The substrate may be a separable substrate when using a method such as transferring, that is, a glass substrate or a plastic substrate. Herein, the plastic substrate is not particularly limited in the present invention, and polyarylate, polyethylene terephthalate, polybutylene terephthalate, polysilane, polysiloxane, polysilazane, polyethylene, polycarbosilane, polyacrylate, poly(meth)acrylate, polymethyl acrylate, polymethyl (meth)acrylate, polyethyl acrylate, a cyclic olefin copolymer, polyethyl (meth)acrylate, a cyclic olefin polymer, polypropylene, polyimide, polystyrene, polyvinyl chloride, polyacetal, polyetheretherketone, polyestersulfone, polytetrafluoroethylene, polyvinylidene fluoride, a perfluoroalkyl polymer and the like may be used.

As necessary, ultrasonic waves may be applied to the coating solution prepared for coating in order for uniform dispersion. Dispersibility of the partially-reduced graphene oxide and the lithium ion conducting polymer in the solution may be enhanced when further including grinding with ultrasonic waves, and a coating layer having more uniform properties may be prepared.

The coating in this step is not particularly limited, and any known wet coating method may be used. As one example, a method of uniformly dispersing using a doctor blade and the like, methods such as die casting, comma coating, screen printing and vacuum filtration coating, and the like may be included.

Then, a drying process for removing the solvent is performed after the coating. The drying process is performed at a temperature and for a period of time enough to sufficiently remove the solvent, and the condition may vary depending on the solvent type and is not particularly limited in the present invention. As one example, the drying may be performed in a vacuum oven at 30° C. to 200° C., and as the drying method, drying methods such as drying by warm air, hot air or low humidity wind, or vacuum drying may be used. The drying time is not particularly limited, however, the drying is normally performed in a range of 30 seconds to 24 hours.

By controlling the concentration of the coating solution according to the present invention, or the number of coating, a coating thickness of the finally coated coating layer may be controlled.

In addition, the coating layer according to the present invention further comprises a lithium salt in order to more smoothly transfer lithium ions.

The lithium salt is not particularly limited in the present invention, and any may be used as long as it is capable of being used in known lithium secondary batteries. Specific examples of the lithium salt may include LiCl, LiBr, LiI, LiClO$_4$, LiBF$_4$, LiBnCln, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, chloroborane lithium, lower aliphatic carboxylic acid lithium, lithium tetraphenylborate, lithium imide and the like, and preferably, lithium bis(trifluoromethane sulfonyl)imide (LiTFSI) represented by (CF$_3$SO$_2$)$_2$NLi or lithium bis(fluorosulfonyl)imide (LiFSI) represented by (FSO$_2$)$_2$NLi may be included.

Such an ion conducting polymer and a lithium salt are preferably used in 10% by weight or less in 100% by weight of the coating layer composition.

The separator (5) provided with the coating layer as described above may be preferably used in a lithium secondary battery as illustrated in FIG. 1.

Such a lithium secondary battery resolves problems caused by lithium polysulfide and improves problems of capacity decrease and lifetime decrease in the lithium secondary battery, and accordingly, may be used as a lithium secondary battery having improved lifetime properties as well as obtaining high capacity and high loading electrodes, and having high stability with no possibility of explosion and fire.

The positive electrode, the negative electrode and the electrolyte liquid provided in the lithium secondary battery are described as follows.

The positive electrode has a form of laminating a positive electrode active material on a positive electrode current collector.

The positive electrode current collector is not particularly limited as long as it has high conductivity without inducing chemical changes to a battery, and for example, stainless steel, aluminum, nickel, titanium, baked carbon, aluminum or stainless steel of which surface is treated with carbon, nickel, titanium, silver and the like, or the like may be used.

The positive electrode active material may comprise elemental sulfur (S$_8$), sulfur series compounds or mixtures thereof, and these are composited with a conductor when used since a sulfur material alone does not have electrical conductivity. Specifically, the sulfur series compound may be Li$_2$Sn (n≥1), an organosulfur compound, a carbon-sulfur polymer ((C$_2$S$_x$)n: x=2.5~50, n≥2) or the like.

The conductor is used for further enhancing conductivity of the electrode active material. Such a conductor is not particularly limited as long as it has conductivity without inducing chemical changes to the corresponding battery, and for example, graphite such as natural graphite or artificial graphite; carbon black such as carbon black, acetylene black, ketjen black, channel black, furnace black, lamp black or thermal black; conductive fibers such as carbon fiber or metal fiber; fluorinated carbon; metal powder such as aluminum powder and nickel powder; conductive whiskers such as zinc oxide or potassium titanate; conductive metal oxides such as titanium oxide; polyphenylene derivatives, and the like may be used.

The positive electrode may further include a binder for binding of the positive electrode active material and the conductor and for binding on the current collector. The binder may comprise a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoroethylene copolymer, an ethylene-acrylic acid copolymer and the like may be used either alone or as a mixture, however, the binder is not limited thereto, and those capable of being used as a binder in the art may all be used.

Such a positive electrode may be prepared using common methods, and specifically, may be prepared by coating a composition for forming a positive electrode active material layer prepared by mixing a positive electrode active material, a conductor and a binder in an organic solvent or water on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, acetonitrile, methanol, ethanol, tetrahydrofuran, isopropyl alcohol and the like may be included.

The negative electrode may have a form of laminating a negative electrode active material on a negative electrode current collector. The negative electrode current collector may not be included when necessary.

Herein, the negative electrode current collector is not particularly limited as long as it has conductivity without comprising chemical changes to a battery, and for example, copper, stainless steel, aluminum, nickel, titanium, baked carbon, copper or stainless steel of which surface is treated with carbon, nickel, titanium, silver and the like, aluminum-cadmium alloys or the like may be used. In addition, as the form, various forms such as films with/without micro-unevenness formed on the surface, sheets, foil, nets, porous bodies, foams and non-woven fabrics may be used.

The lithium metal layer may be lithium metal or a lithium alloy. Herein, the lithium alloy comprises elements capable of alloying with lithium, and the element may be Si, Sn, C, Pt, Ir, Ni, Cu, Ti, Na, K, Rb, Cs, Fr, Be, Mg, Ca, Sr, Sb, Pb, In, Zn, Ba, Ra, Ge, Al, Co or an alloy thereof.

The lithium metal layer may be a sheet or foil, and, in some cases, may have a form of depositing or coating lithium metal or lithium alloy on a current collector using a dry process, or may have a form of depositing or coating particulate metal and alloy using a wet process.

The electrolyte liquid of the lithium secondary battery is a lithium-salt containing electrolyte liquid, and may be an aqueous or non-aqueous electrolyte liquid, is preferably a non-aqueous electrolyte formed with an non-aqueous organic solvent electrolyte liquid and a lithium salt. In addition thereto, an organic solid electrolyte, an inorganic solid electrolyte or the like may be included, however, the electrolyte liquid is not limited thereto.

Examples of the non-aqueous organic solvent may comprise aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy furan, 2-methyl-tetrahydrofuran, dimethyl sulfoxide, 1,3-dioxolane, 4-methyl-1,3-dioxane, diethyl ether, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used.

Herein, an ether-based solvent similar to the solvent of the electrode protective layer of the present invention is used as the non-aqueous solvent, and examples thereof may comprise tetrahydrofuran, ethylene oxide, 1,3-dioxolane, 3,5-dimethyl isoxazole, 2,5-dimethylfuran, furan, 2-methylfuran, 1,4-oxane, 4-methyldioxolane and the like.

The lithium salt is a material favorably dissolved in the non-aqueous electrolyte, and examples thereof may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, chloroborane lithium, lower aliphatic carboxylic acid lithium, lithium tetraphenylborate, lithium imide and the like.

The shape of the lithium secondary battery (10) described above is not particularly limited, and examples thereof may comprise a jelly-roll type, a stack type, a stack-folding type (comprising stack-Z-folding type) or a lamination-stack type, and may preferably be a stack-folding type.

After preparing an electrode assembly having such positive electrode (3), the separator (5) and the negative electrode (1) as above consecutively laminated, the electrode assembly is placed in a battery case, the electrolyte liquid is injected to the top of the case, and the result is sealed with a cap plate and a gasket and then assembled to manufacture the lithium secondary battery (10).

The lithium secondary battery (10) may be divided into a cylinder-type, a square-type, a coin-type, a pouch-type and the like, and depending on the size, may be divided into a bulk type and a thin film type. Structures and manufacturing methods of these batteries are widely known in the art, and therefore, detailed descriptions thereon are not included.

The lithium secondary battery (10) according to the present invention is a high capacity and high loading battery, and may be used as a power supply of devices requiring such properties. Specific examples of the device may comprise power tools operated through receiving electric power by a battery motor; electric vehicles comprising electric vehicles (EV), hybrid electric vehicles (HEV), plug-in hybrid electric vehicles (PHEV) and the like; electric two-wheeled vehicles comprising e-bikes, e-scooters and the like; electric golf carts; systems for power storage and the like, but are not limited thereto.

Hereinafter, examples, comparative example and experimental examples are described in order to illuminate effects of the present invention. However, the following descriptions are just one example regarding contents and effects of the present invention, and the scope of a right and effects of the present invention are not limited thereto.

EXAMPLE

Example 1

(1) Preparation of Separator

As a porous base, a polyethylene (porosity 50%) film having a thickness of 20 μm was prepared.

After mixing a partially-reduced graphene oxide (oxygen atom content in graphene 15%) aqueous dispersion (0.002% by weight concentration) heat treated at 400° C. and a lithiated NAFION™ (Du Pont) aqueous dispersion (0.25 mg/mL concentration), ultrasonic waves were applied thereto for 8 hours to prepare a coating solution (partially-reduced graphene oxide:lithiated NAFION™=1:12.5 weight ratio).

The coating solution was poured on the porous base, and the result was vacuum filtered to form a coating layer in 10 μg/cm$^2$ on a surface facing a positive electrode of the porous base. The result was dried for 24 hours at 70° C. to prepare a separator. Herein, the coating layer was measured to have a thickness of approximately 0.4 μm±0.2 μm.

(2) Lithium Secondary Battery

Conductive carbon having electrical conductivity and sulfur were mixed in a conductive carbon:sulfur weight ratio (wt %) of 30:70 (21 g:49 g) through a ball mill process to obtain a sulfur-carbon composite. Positive electrode active material slurry was prepared in a composition of, with respect to the total weight of the positive electrode active material slurry, a positive electrode active material comprising the composite (70.0 g), Super-P (20.0 g) as a conductor, polyvinylidene fluoride (10.0 g) as a binder, and N-methyl-2-pyrrolidone (500 g) as a solvent, and the slurry was coated on an aluminum current collector to prepare a positive electrode active site.

With the positive electrode, lithium foil having a thickness of approximately 40 μm was used as a negative electrode, and as an electrolyte liquid, 1 M concentration of LiN(CF$_3$SO$_2$)$_2$-dissolved dimethoxyethane:dioxolane (1:1 volume ratio) mixture solution was used, and the separator was used to manufacture a lithium secondary battery.

Example 2

A lithium secondary battery was manufactured in the same manner as in Example 1 except that the coating layer was formed on the porous base in 20 μg/cm², twice the coating amount compared to Example 1.

Comparative Example 1

A lithium secondary battery was manufactured in the same manner as in Example 1 except that the coating layer was not formed, and the porous base itself was used as the separator.

Comparative Example 2

A lithium secondary battery was manufactured in the same manner as in Example 1 except that partially-reduced graphene oxide was used alone as the coating layer.

Comparative Example 3

A lithium secondary battery was manufactured in the same manner as in Example 1 except that lithiated NAFION™ was used alone as the coating layer.

Experimental Example 1

Each of the lithium secondary batteries manufactured in the examples and the comparative examples was operated under a 0.1 C/0.1 C (2.5 cycles) and 0.2 C/0.2 C charge/discharge condition. Initial charge and discharge capacity was measured, and after performing 25 cycles, a change in the capacity was identified.

Figure 2:
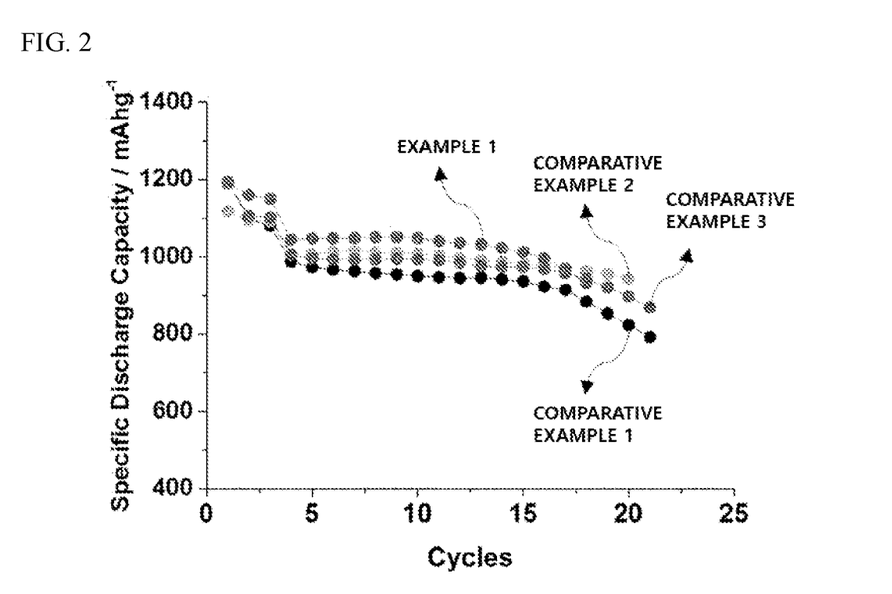
FIG. 2 is a graph showing lifetime properties of lithium secondary batteries manufactured in Example 1, and Comparative Examples 1 to 3.

FIG. 2 is a graph showing lifetime properties of the lithium secondary batteries manufactured in Example 1, and Comparative Examples 1 to 3. When examining FIG. 2, it was seen that the battery of Example 1 had a higher capacity retention rate with respect to initial charge and discharge and exhibited a capacity improving effect, and had a superior capacity retention rate compared to Comparative Example 1 with no coating layer formation, Comparative Example 2 coating only a reduced oxide graphene coating layer, or Comparative Example 3 coating only a lithiated NAFION™ polymer.

Figure 3:
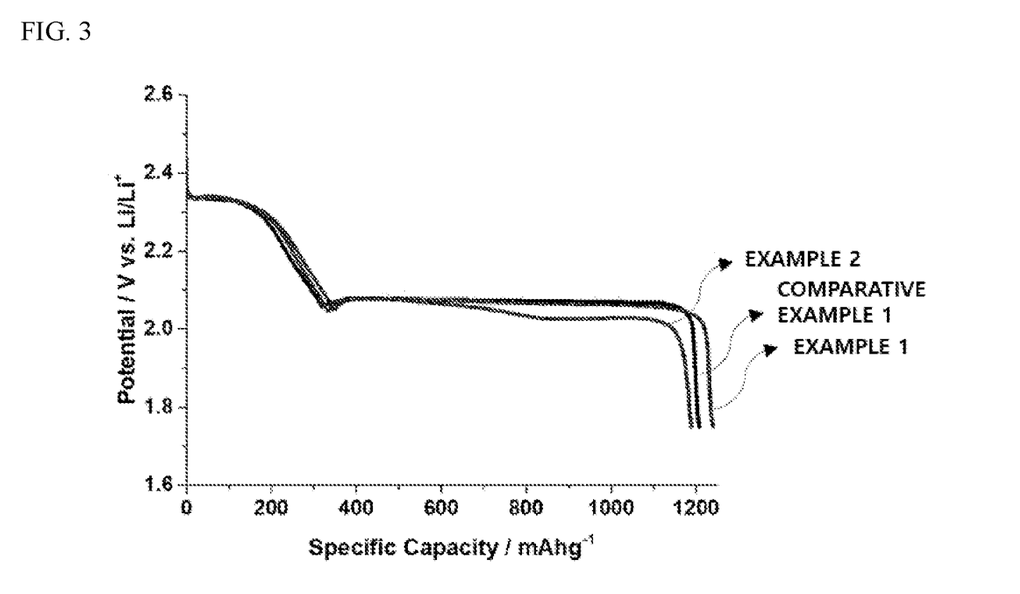
FIG. 3 is a graph showing initial charge and discharge capacity of lithium secondary batteries manufactured in Examples 1 and 2, and Comparative Example 1.

FIG. 3 is a graph showing initial charge and discharge capacity of the lithium secondary batteries manufactured in Examples 1 and 2, and Comparative Example 1. When referring to FIG. 3, it was seen that the battery of Example 1 having a coating layer according to the present invention had higher initial discharge capacity compared to the battery of Comparative Example 1 not provided with the coating layer.

Figure 4:
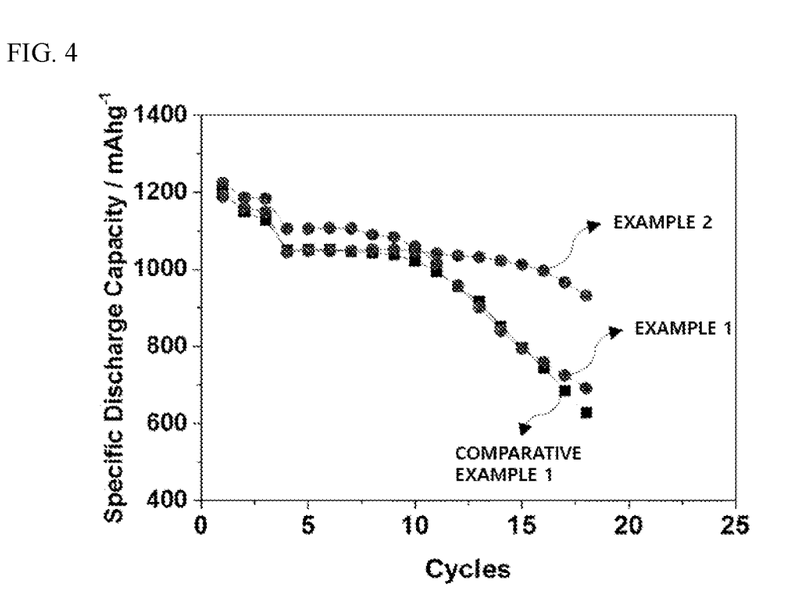
FIG. 4 is a graph showing lifetime properties of lithium secondary batteries manufactured in Examples 1 and 2, and Comparative Example 1.

FIG. 4 is a graph showing lifetime properties of the lithium secondary batteries manufactured in Examples 1 and 2, and Comparative Example 1. When examining FIG. 4, it was seen that the battery of Example 1 exhibited a higher capacity retention rate compared to the battery of Comparative Example 1 with no coating layer formation, and the battery of Example 2 using twice the coating amount had excellent lifetime properties with an increased lifetime by approximately two times while having a similar capacity retention rate level (refer to FIG. 3).

From such results, it was seen that, by the coating layer provided in the present invention, high initial charge and discharge capacity properties and excellent lifetime properties were able to be secured through adsorbing lithium polysulfide when driving a lithium secondary battery.

REFERENCE NUMERAL

10: Lithium Secondary Battery
1: Negative Electrode
3: Positive Electrode
5: Separator

The invention claimed is:

1. A separator for a lithium secondary battery comprising:
a porous base; and
a coating layer formed on at least one surface of the porous base,
wherein the coating layer comprises partially-reduced graphene oxide and a lithium ion conducting polymer,
wherein the coating layer has a thickness of 200 nm to 3 μm,
wherein the lithium ion conducting polymer comprises one or more material selected from the group consisting of polyurethane, lithium-substituted copolymer of a sulfonated tetrafluoroethylene-based fluorine polymer, polyethylene oxide, polypropylene oxide, polysiloxane, polystyrene and polyethylene glycol, and
wherein the partially-reduced graphene oxide and the lithium ion conducting polymer are present in the coating layer in a weight ratio of 1:10 to 1:15.

2. The separator for a lithium secondary battery of claim 1, wherein the partially-reduced graphene oxide comprises an oxygen atom in 1% to 30% with respect to a total of the partially-reduced graphene oxide.

3. The separator for a lithium secondary battery of claim 1, wherein the partially-reduced graphene oxide comprises an oxygen atom in 2% to 20% with respect to a total of the partially-reduced graphene oxide.

4. The separator for a lithium secondary battery of claim 1, wherein the partially-reduced graphene oxide comprises an oxygen atom in 3% to 17% with respect to a total of the partially-reduced graphene oxide.

5. The separator for a lithium secondary battery of claim 1, wherein the partially-reduced graphene oxide is present in the coating layer in an amount of 5 μg/cm² to 100 μg/cm² with respect to a total area of the separator.

6. The separator for a lithium secondary battery of claim 1, wherein the partially-reduced graphene oxide is present in the coating layer in an amount of 5 μg/cm² to 40 μg/cm² with respect to a total area of the separator.

7. The separator for a lithium secondary battery of claim 1, wherein the partially-reduced graphene oxide is present in the coating layer in an amount of 5 μg/cm² to 20 μg/cm² with respect to a total area of the separator.

8. The separator for a lithium secondary battery of claim 1, wherein the porous base has a thickness of 3 μm to 100 and a pore size of 0.01 μm to 10 μm.

9. The separator for a lithium secondary battery of claim 1, wherein the porous base comprises one or more material selected from the group consisting of polyethylene, polypropylene, polyethylene terephthalate, polybutylene terephthalate, polyamide, polyacetal, polycarbonate, polyimide, polyetherketone, polyethersulfone, polyphenylene oxide, polyphenylene sulfide, polyethylene naphthalene, polytetrafluoroethylene, polyvinylidene fluoride, polyvinyl chloride, polyacrylonitrile, cellulose, polyparaphenylene benzobisoxazole and polyarylate.

10. A lithium secondary battery comprising the separator of claim 1.

11. The lithium secondary battery of claim 10, comprising a sulfur compound in a positive electrode.

12. The lithium secondary battery of claim 10, further comprising:
an anode; and
a cathode, wherein the separator is interposed between the anode and the cathode and wherein the coating layer is present on the surface of the porous base of the separator which faces the cathode.

* * * * *